US006728680B1

(12) United States Patent
Aaron et al.

(10) Patent No.: US 6,728,680 B1
(45) Date of Patent: Apr. 27, 2004

(54) METHOD AND APPARATUS FOR PROVIDING VISUAL FEEDBACK OF SPEED PRODUCTION

(75) Inventors: Joseph D. Aaron, Jonestown, TX (US); Peter Thomas Brunet, Round Rock, TX (US); Frederik C. M. Kjeldsen, Poughkeepsie, NY (US); Paul S. Luther, Round Rock, TX (US); Robert Bruce Mahaffey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 09/714,762

(22) Filed: Nov. 16, 2000

(51) Int. Cl.[7] ......................... G10L 21/06; G10L 11/00; G10L 15/26; G09B 19/04

(52) U.S. Cl. ....................... 704/271; 704/278; 704/235; 434/185

(58) Field of Search ...................... 715/500.1; 709/203; 704/276, 270, 267, 258, 235, 200, 1; 434/322, 252, 185, 178, 169, 156

(56) References Cited

U.S. PATENT DOCUMENTS

| | | | | |
|---|---|---|---|---|
| 5,836,770 A | * | 11/1998 | Powers | 434/247 |
| 6,109,923 A | * | 8/2000 | Rothenberg | 434/185 |
| 6,151,577 A | * | 11/2000 | Braun | 704/276 |
| 6,293,802 B1 | * | 9/2001 | Ahlgren | 434/252 |
| 6,332,147 B1 | * | 12/2001 | Moran et al. | 715/500.1 |
| 6,336,089 B1 | * | 1/2002 | Everding | 704/1 |
| 6,397,185 B1 | * | 5/2002 | Komissarchik et al. | 704/270 |

OTHER PUBLICATIONS

De Filippo et al., "Linking Visual and Kinesthetic Imagery in Lipreading Instruction," Feb. 1995, Journal of Speech and Hearing Research, vol. 38, pp. 244–256.*

Jiang et al., "Visual speech analysis and synthesis with application to Mandarin speech training," 1999, Proceedings of the ACM symposium on Virtural reality software and technology, pp. 111–115.*

* cited by examiner

*Primary Examiner*—Richemond Dorvil
*Assistant Examiner*—V. Paul Harper
(74) *Attorney, Agent, or Firm*—Duke W. Yee; Marilyn Smith Dawkins; Stephen J. Walder, Jr.

(57) ABSTRACT

A data processing system collects video and audio samples of acceptable speech production. A video camera focuses on a speaker's face and, particularly, articulation visible in the area of the mouth or other body movements associated with speech production. Video files are used to archive acceptable and unacceptable productions. These files may then be used to provide feedback about acceptable and unacceptable ways to produce speech. A speech professional or language teacher may play a model speech production and a subject speech attempt simultaneously to compare articulation, audio analysis, and appearance of articulators. A subject may play a model speech production and record a speech attempt simultaneously to attempt to mimic the appearance of articulators. Image processing may be used to create a mirror image of a video model or a current attempt or both to avoid left-right confusion.

28 Claims, 6 Drawing Sheets

METHOD AND APPARATUS FOR PROVIDING VISUAL FEEDBACK OF SPEED PRODUCTION

BACKGROUND OF THE INVENTION

1. Technical Field

The present invention relates generally to analysis of human speech and, in particular, to an improved method and apparatus for providing visual feedback relative to speech production.

2. Description of Related Art

Most people take human speech for granted. However, various speech impediments or physical deficiencies may impair an individual's abilities to produce what may be considered "normal" human speech. Speech pathologists are professionals who work with individuals who cannot speak in a normal manner. Typically, a speech pathologist will work with such an individual over a period of time to teach the individual how to more accurately produce desired sounds.

A speech pathologist encourages such an individual to concentrate on the articulators that produce acceptable speech. These articulators include the lips, teeth, the tongue, etc. Conventionally, a videotape player and a mirror are used to allow an individual to compare the individual's externally visible articulators with those of a model. However, a videotape player does not allow for easy replay of short speech production models. Furthermore, people may suffer from left-right confusions due to, for example, neurological damage, learning disabilities, and possible visual processing problems. Therefore, the comparison of a mirror image with a videotape reproduction may create confusion for such an individual.

Computers and computer software provide tools to improve the tasks of a speech professional. These software tools analyze an incoming speech sample with comparisons to a stored speech sample to determine whether a particular sound, such as a phoneme, has been made correctly. Once a model is created, an incoming sound may be compared to the model. If the incoming sound does not fit within the range of the model, the user is notified of the discrepancy.

However, the prior art speech and language analysis software tools provide feedback based only on acoustic information. Therefore, it would be advantageous to provide visual feedback of speech production and to associate a speech model with the articulators responsible for speech production.

SUMMARY OF THE INVENTION

The present invention collects video and audio samples of acceptable speech production. A camera focuses on a speaker's face and, particularly, articulation visible in the vicinity of the mouth, or other body movements associated with speech production. Video files are used to archive acceptable and unacceptable productions, as well as acceptable facial expressions that enhance communication. These files may then be used to provide feedback about acceptable and unacceptable ways to produce speech. The camera is also used to provide real-time feedback as a person is speaking for comparison with a stored model. A speaker may use video models in conjunction with acoustic models for comparison with a current attempt. Image processing may be used to create a mirror image of a video model or a current attempt or both to avoid left-right confusion.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
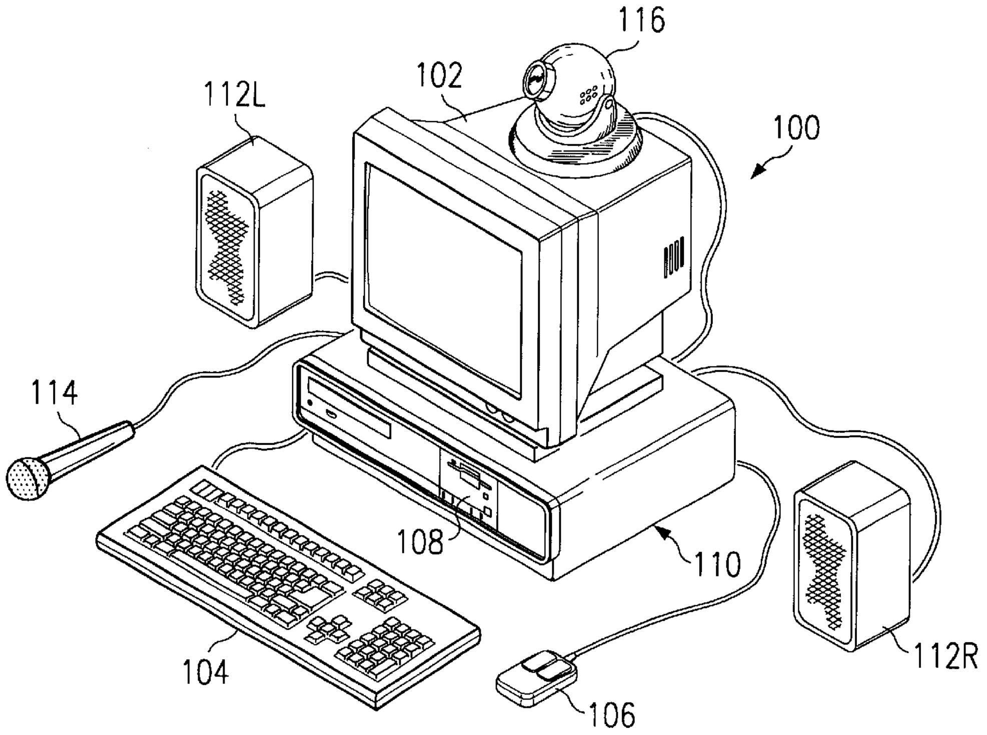
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joysitck, touchpad, touch screen, trackball, and the like.

Computer 100 also includes a left speaker 112L, a right speaker 112R, a microphone 114, and a camera 116. Speakers 112L, 112R provide output of speech models to the speaker or output of speech attempts to a speech pathologist or other speech professional. Alternatively, speakers 112L, 112R may be replaced with headphones or other audio output device. For example, audio output may be connected to the input of a tape recorder.

Microphone 114 accepts audio samples and speech attempts for use by the present invention. Alternatively, microphone 114 may be replaced with other audio input device. For example, audio input may be connected to the output of a tape player. Speech models or speech attempts may also be accepted in another known manner, such as by telephone input via a modem or voice-over-Internet communication.

Camera 116 may be a commercially available "web cam" or other digital video input device. Camera 116 may also be a conventional analog video camera connected to a video capture device, which are known in the art. The camera accepts video models, in conjunction with the microphone accepting acoustic signals, of acceptable speech production and speech attempts. Video models of acceptable speech and speech attempts may also be accepted in another known manner, such as by use of video conferencing over the Internet or telephone line. Video models may also be computer generated models demonstrating proper speech production.

Computer 100 can be implemented using any suitable computer, such as an IBM personal computer (PC) or ThinkPad computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
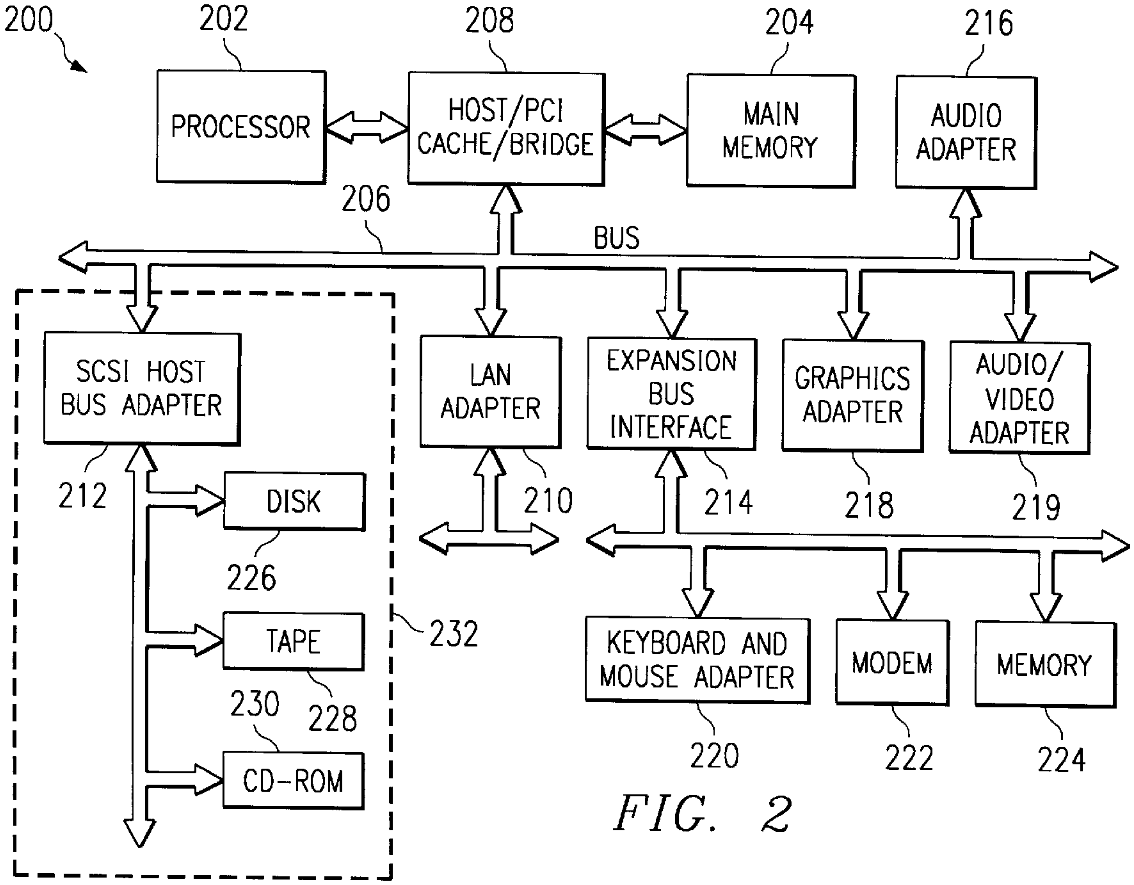
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, which may be a serial, PS/2, USB or other known adapter, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 98 or Windows 2000, which are available from Microsoft Corporation. Instructions for the operating system and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

Figure 3:
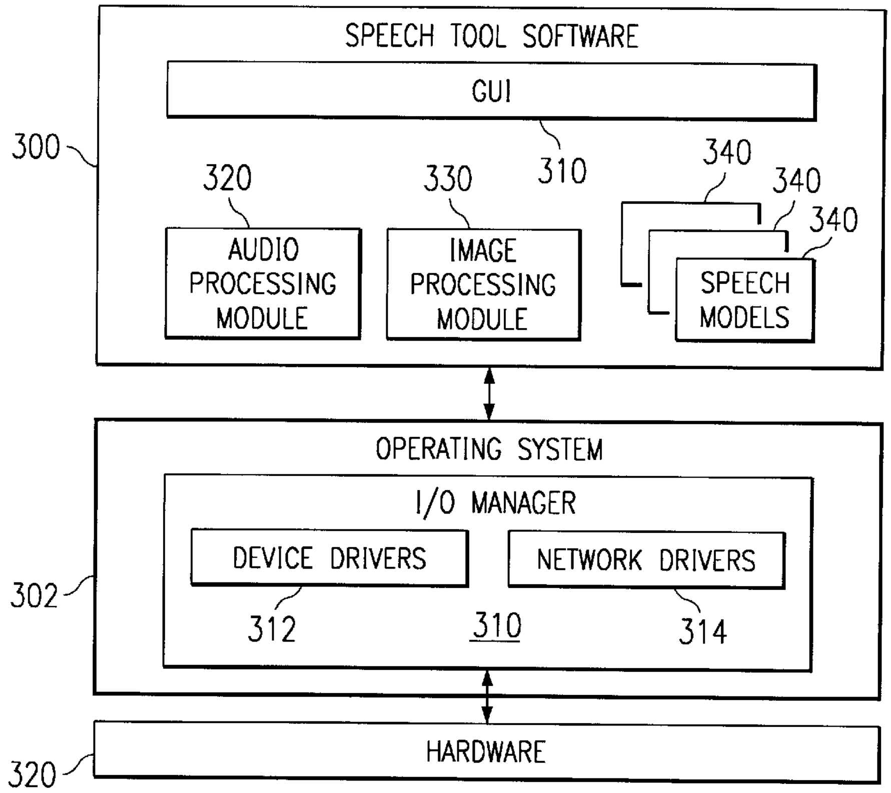
FIG. 3 is a block diagram illustrating the software organization within a data processing system in accordance with a preferred embodiment of the present invention.

With reference now to FIG. 3, a block diagram is shown illustrating the software organization within data processing system 200 in FIG. 2 in accordance with a preferred embodiment of the present invention. Operating system 302 communicates with speech tool software 300. The operating system communicates with hardware 320 directly through input/output (I/O) manager 310. I/O manager 310 includes device drivers 312 and network drivers 314. Device drivers 312 may include a software driver for a printer or other device, such as a display, fax modem, sound card, etc. The operating system receives input from the user through hardware 320. Speech tool software 300 sends information to and receives information from a network, such as the Internet, by communicating with network drivers 314 through I/O manager 310. The speech tool software may be located on storage devices, such as hard disk drive 226, and may be loaded into main memory 204 for execution by processor 202, in FIG. 2.

In this example, speech tool software 300 includes a graphical user interface (GUI) 310, which allows the user to interface or communicate with speech tool software 300. This interface provides for selection of various functions through menus and allows for manipulation of elements displayed within the user interface by use of a mouse. For example, a menu may allow a user to perform various functions, such as saving a file, opening a new window, displaying a speech pattern, and invoking a help function.

Audio processing module 320 decodes audio from an audio file or an audio/video file for presentation through an audio output device. The user may control the presentation by the audio processing module through use of the GUI, as will be discussed below. Audio processing module 320 also performs analysis of speech in an audio file or an audio/video file to generate waveforms to be presented through GUI 310. Speech analysis techniques are described in U.S. Pat. No. 5,832,441, entitled "CREATING SPEECH MODELS," issued to Aaron et al. on Nov. 3, 1998, which is herein incorporated by reference in its entirety. Other aspects of the graphical user interface are described in U.S. Pat. No. 5,884,263, entitled "COMPUTER NOTE FACILITY FOR DOCUMENTING SPEECH TRAINING," issued to Aaron et al. on Mar. 16, 1999, which is herein incorporated by reference in its entirety.

Image processing module 330 decodes video from a video file or an audio/video file for presentation through an output device. The user may control the presentation by the video processing module through use of the GUI, as will be discussed below. Image processing module 330 also performs image processing to present a mirror image of video input of the camera or digitizer to either create a video file for later playback or display the video immediately in real time, upon request by the user.

Speech models 340 are models of acceptable speech production stored for presentation by GUI 310. Speech tool software 300 synchronizes the audio and video from a selected speech model with the audio and video from a current subject attempt for comparison. Using the GUI, the user may move back and forth in the model and subject attempt simultaneously to compare, for example, pitch, loudness, or the appearance of articulators and facial gestures during a speech attempt.

Figure 4A:
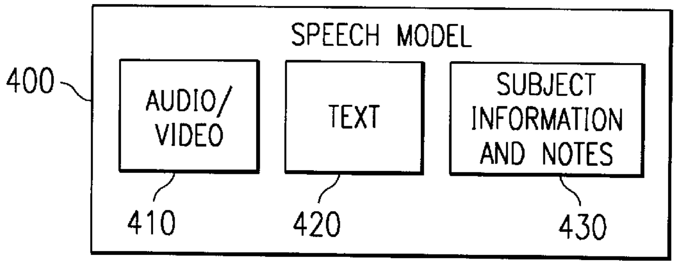
FIGS. 4A and 4B are block diagrams illustrating the arrangement of a speech model in accordance with a preferred embodiment of the present invention.

With reference now to FIG. 4A, a block diagram is shown illustrating the arrangement of a speech model in accordance with a preferred embodiment of the present invention. Speech model 400 is an example of one of speech models 340 in FIG. 3. The speech model includes audio/video 410, the speech text 420, which is a textual representation of the speech sample and subject information and notes 430. The speech model may be stored as a single files such as a compressed file from which the audio/video file, text file, and subject information and notes may be extracted. The speech model may also be stored as a database file or other configuration as will be readily apparent to a person of ordinary skill in the art.

In the depicted example, audio/video 410 may be a known audio/video file, such as a moving pictures experts group (MPEG) or audio video interleaved (AVI) file. Text 420 is the exercise being spoken in the speech model and may be stored as American standard code for information interchange (ASCII) text. Subject information and notes 430 identify the person who is the subject of the model and may also identify the subject's speech impediment. The subject information and notes may also be stored as ASCII text. In the example shown in FIG. 4A, the audio and video are stored in a single file configuration and the speech tool software must separate the audio from the video in order to perform audio processing and image processing.

Figure 4B:
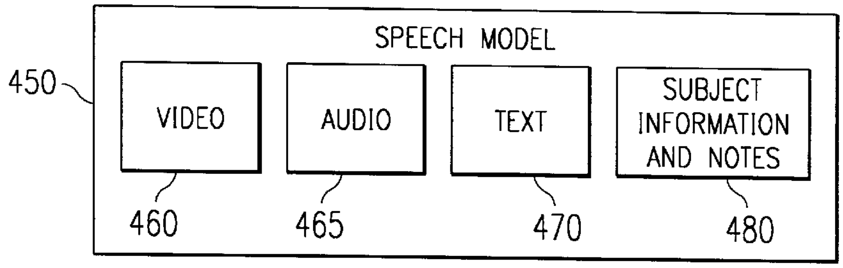

With reference now to FIG. 4B, a block diagram is shown illustrating the arrangement of a speech model in accordance with a preferred embodiment of the present invention, Speech model 450 is an alternative example of one of speech models 340 in FIG. 3. The speech model includes audio 465 video 460 the speech text 470, and subject information and notes 480. The speech model may be stored as a single file, such as a compressed file from which the audio/video file, text file, and subject information and notes may be extracted. The speech model may also be stored as a database file or other configuration as will be readily apparent to a person of ordinary skill in the art.

In the depicted example, audio 465 may be a known audio file format, such as a wave file. Video 460 may be a known video file, such as an MPEG or AVI file. Text 470 is the exercise being spoken in the speech model and may be stored as ASCII text. Subject information and notes 480 indentifies the person who is the subject of the model and may also identify the subject's speech impediment. The subject information and notes may also be stored as ASCII text. In the example shown in FIG. 4B the audio and video are stored separately and must be synchronized by the speech tool software.

Figure 5A:
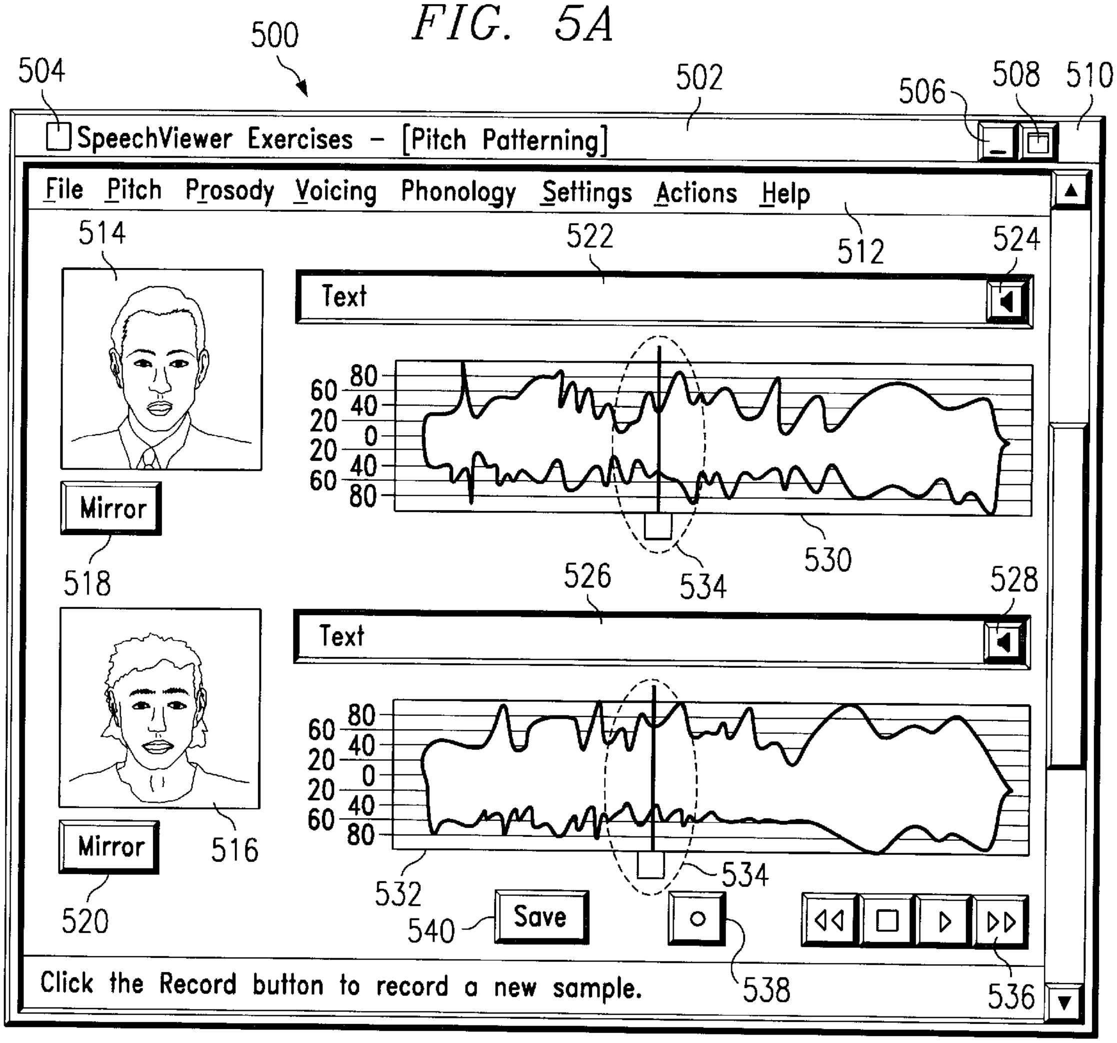
FIGS. 5A and 5B are example screens of display of a speech tool according to a preferred embodiment of the present invention.

An example of a screen of display of a speech tool is shown in FIG. 5A according to a preferred embodiment of the present invention. The screen comprises window 500, including a title bar 502, which may display the title of an exercise and the name of the application program. Title bar 502 also includes a control box 504, which produces a drop-down menu (not shown) when selected with the mouse, and "minimize" 506, "maximize" or "restore" 508, and "close" 510 buttons. The "minimize" and "maximize" or "restore" buttons 506 and 508 determine the manner in which the program window is displayed. In this example, the "close" button 510 produces an "exit" command when selected. The drop-down menu produced by selecting control box 504 includes commands corresponding to "minimize," "maximize" or "restore," and "close" buttons, as well as "move" and "resize" commands.

Speech tool window 500 also includes a menu bar 512. Menus to be selected from menu bar 512 include "File", "Pitch", "Prosody", "Voicing", "Phonology", "Settings", "Actions", and "Help." However, menu bar 512 may include fewer or more menus, as understood by a person of ordinary skill in the art.

The speech tool window display area includes a model video window 514 and a subject attempt video window 516. "Mirror" button 518 allows the user to invert the display of model video window 514 to present a mirror image. "Mirror" button 520 allows the user to invert the display of subject attempt video window 516 to present a mirror image. People may suffer from left-right confusions due to, for example, neurological damage, learning disabilities, and possible visual processing problems. Therefore, the ability to present a mirror image in each video window may avoid confusion for such an individual. The display of an inverted image is performed in a manner known in the art of image processing and display.

The model video window has associated therewith a display 522 of the text being spoken in the model and a mute button 524 to allow the user to mute the sound of the model speech. The subject attempt video window has associated therewith a display 526 of the text being spoken in the model and a mute button 528 to allow the user to mute the sound of the subject speech attempt. In most cases, the text of the model will be identical to the text of the subject speech attempt. However, a speech professional may wish to compare different speech attempts if they have a word or utterance, also referred to as a phoneme, in common. In such a case, however, the user must mark the portions of the speech samples to be compared to allow the speech tool software to synchronize the portions for display. The process of muting the sound of a speech sample is performed in a manner known in the art of video and audio processing and presentation.

An acoustic display 530 of a derivative of the speech, such as an intensity envelope of the waveform's loudness, and an acoustic display 532 of the subject speech attempt are also displayed in the display area of speech tool window 500. In the example shown in FIG. 5A, the derivative acoustic display is a pitch pattern, as indicated in title bar 502. However, other acoustic displays may be used for analysis, as will be appreciated by a person of ordinary skill in the art. A cursor 534 is shown in each acoustic display to indicate the current position in the speech sample. The user may advance within the speech sample by manipulation of cursor 534 or by manipulation of control buttons 536. The controls shown in FIG. 5A are meant to be exemplary and modifications to the user interface will be readily apparent to a person of ordinary skill in the art. For example, the user interface may allow a user to drag cursors over a portion of the acoustic display to select a portion for comparison. Until the portion is deselected, the controls will allow the user to advance within only the selected portion rather than displaying the entire speech sample.

Record button 538 allows the user to start and subsequently stop recording to replace the subject attempt with a newly attempted speech production. Alternatively, recording may be started with record button 538 and stopped with the stop button in control buttons 536. While the audio processing module is recording the spoken audio, the user interface advances through the model speech production and displays the model video and live video of the subject simultaneously. This display allows the subject to attempt to mimic the externally visible articulators in the model for proper speech production. Once the speech professional or user acquires a speech attempt, which is an acceptable production, the subject attempt is saved as a model by selection of "Save" button 540.

Figure 5B:
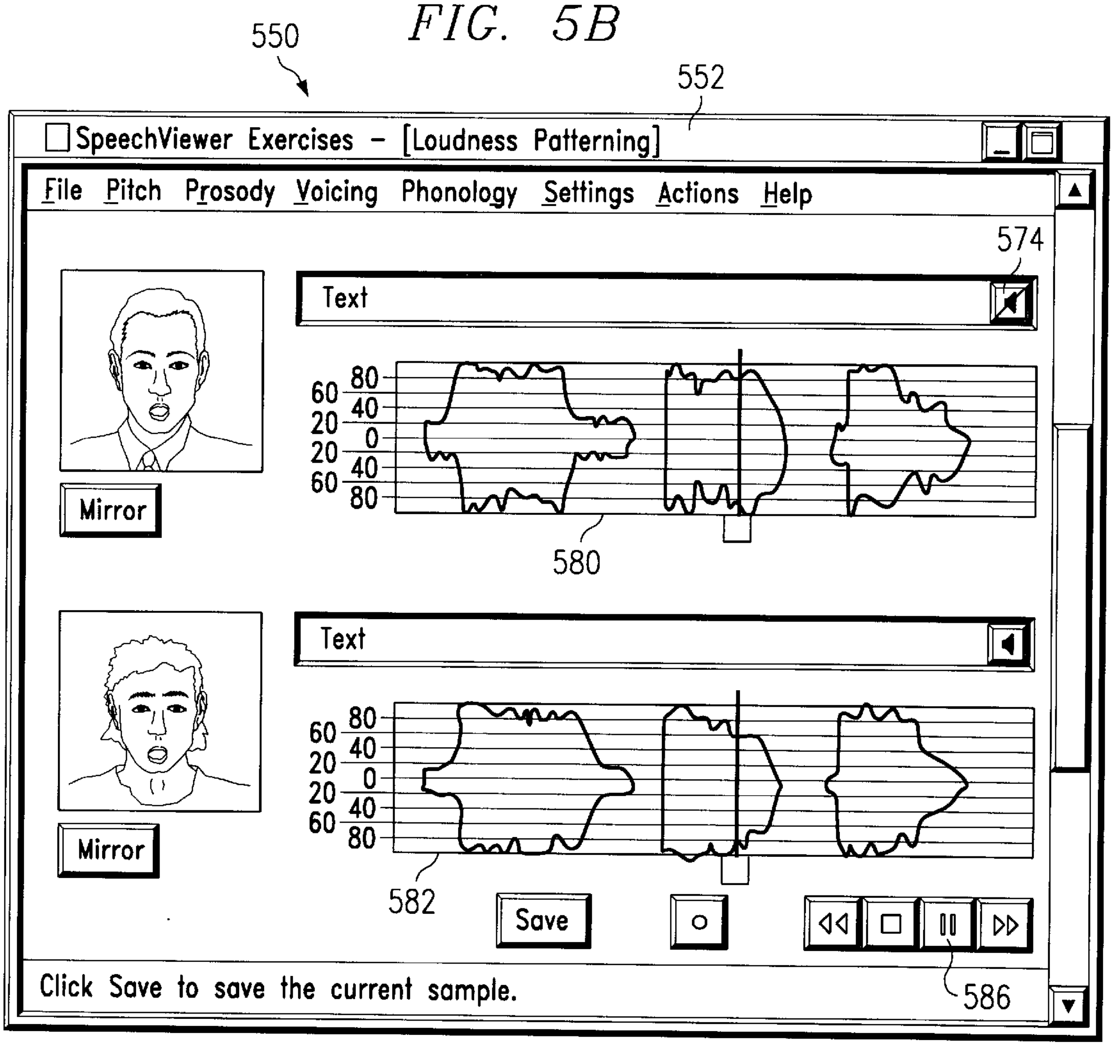

An alternate example of a screen of display of a speech tool is shown in FIG. 5B according to a preferred embodiment of the present invention. Similar to the example shown in FIG. 5A, the screen comprises window 550, including a title bar 552, which indicates the title of the exercise in the depicted example. Accordingly, acoustic displays 580 and 582 are loudness intensity patterns. As indicated by mute button 574, the audio of the model speech production is muted. During play of the model speech production and the subject speech attempt, the play button in control buttons 586 is changed to a pause button.

Figure 6A:
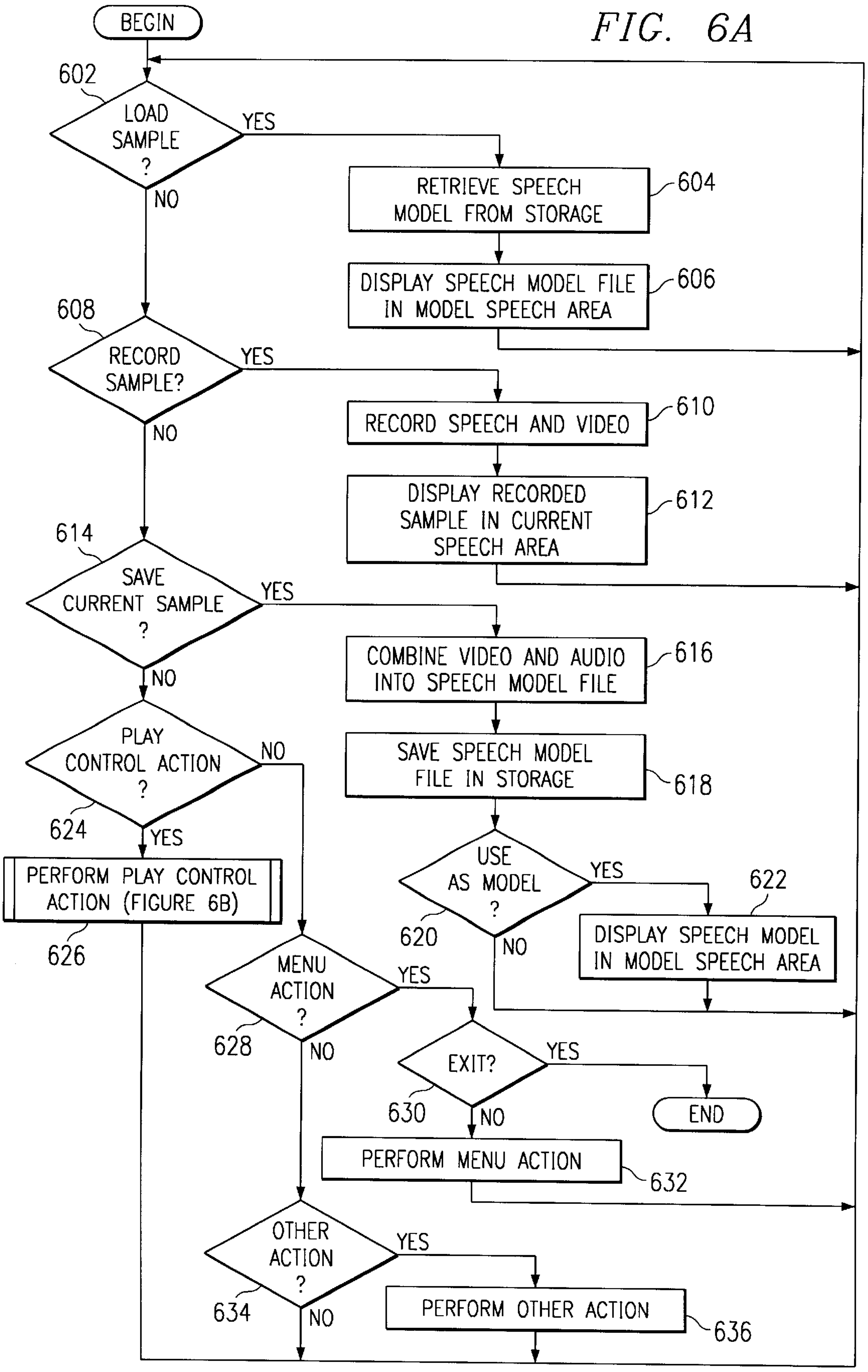
FIGS. 6A and 6B are flowcharts of the operation of speech tool software according to a preferred embodiment of the present invention.

With reference now to FIG. 6A, a flowchart of the operation of speech tool software is depicted according to a preferred embodiment of the present invention. The process begins and a determination is made as to whether an instruction to load a speech model sample has been received (step 602). The combined audio and video of a speech attempt, whether it be a model or a current attempt, is referred to as a "sample" hereafter. Instructions may be received by selection of buttons in the GUI or by other known methods, such as by menu commands or key commands. If an instruction to load a sample is received, the process retrieves a speech model file from storage (step 604) and displays the speech model in the model speech production area of the graphical user interface (step 606). Thereafter, the process returns to step 602 to determine whether an instruction to load a sample is received.

If an instruction to load a speech model sample is not received in step 602, a determination is made as to whether an instruction to record a speech sample is received (step 608). If an instruction to record a speech sample is received, the process records speech and video (step 610) and displays the recorded speech sample in a current speech attempt area of the graphical user interface (step 612). During the recording of the speech and video, the video is displayed in real time. The video may also be displayed in a mirror image, as discussed above, as it is being recorded. Thereafter, the process returns to step 602 to determine whether an instruction to load a sample is received.

If an instruction to record a speech sample is not received in step 608, a determination is made as to whether an instruction to save the current speech sample is received (step 614). If an instruction to save the current speech sample is received, the process combines the video and audio and other information, such as the speech sample text and subject information and notes, into a speech model file (step 616).

Thereafter, the process saves the speech model file in storage (step 618) and a determination is made as to whether an instruction is received to use the stored model in the model speech production area of the graphical user interface (step 620). The determination may be made by prompting the user with a dialog box and receiving a response to the dialog box. However, other known techniques may be used, such as menu commands and buttons in the graphical user interface. If an instruction to use the stored model as the model speech production is received, the process displays the speech model in the model speech production area of the GUI (step 622) and proceeds to step 602 to determine whether an instruction to load a sample is received. If, however, an instruction to use the stored model as the model speech production is not received in step 620, the process proceeds directly to step 602 to determine whether an instruction to load a sample is received.

If an instruction to save the current speech sample is not received in step 614, a determination is made as to whether a play control action is requested (step 624). If a play control action is requested, the process performs the play control action (step 626). The detailed operation of the process or performing the play control action according to a preferred embodiment of the present invention will be described in more detail below with respect to FIG. 6B.

If an instruction to perform a play control action is not received in step 624, a determination is made as to whether a menu selection is received (step 628). If a menu selection is received, a determination is made as to whether the instruction indicated by the menu selection is an exit instruction (step 630). If an exit instruction is received, the process ends. If an exit instruction is not received in step 630, the process performs the menu action (step 632) in a known manner.

If a menu selection is not received in step 628, a determination is made as to whether another action is requested (step 634). In the depicted example, an action may be any action requested through the GUI, such as selection of the minimize button 506, mirror button 518, or mute button 528 in FIG. 5A. If another action is requested, the process performs the action (step 636) and returns to step 602 to determine whether an instruction is received to load a model speech production sample. If another action is not requested in step 634, the process proceeds directly to step 602 to determine whether an instruction is received to load a model speech production sample.

Figure 6B:
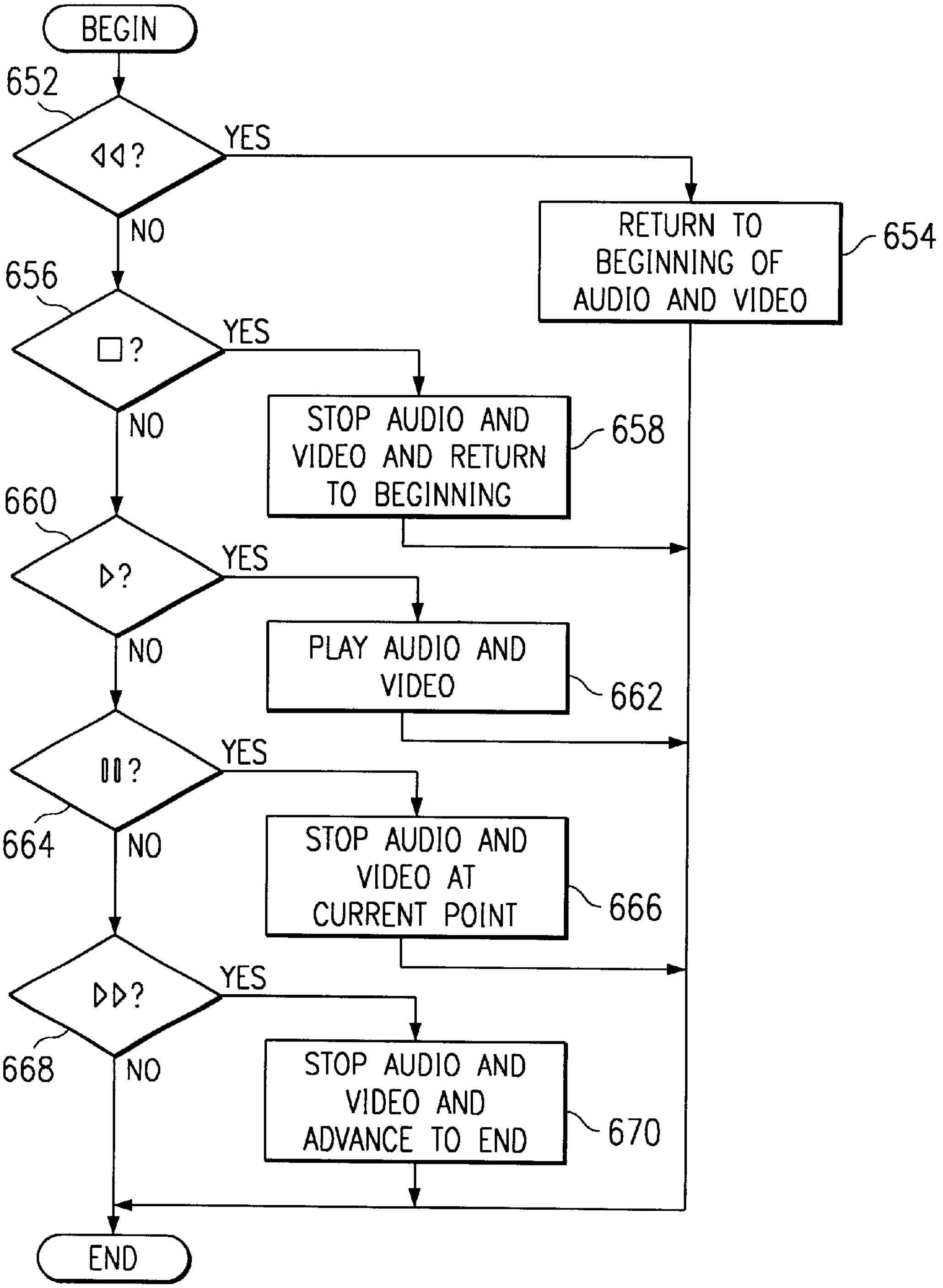

Turning now to FIG. 6B, a flowchart of the operation of performing a play control action is illustrated according to a preferred embodiment of the present invention. The process begins and a determination is made as to whether a rewind instruction is received (step 652). An instruction may be received by selection of a button in the play control buttons 536 in FIG. 5A or 586 in FIG. 5B or by other known methods, such as menu commands or key commands. If a rewind instruction is received, the process returns the audio and video the beginning of the sample and displays the cursor 534 at the beginning of the acoustic display (step 654). Thereafter, the process ends.

If a rewind instruction is not received in step 652, a determination is made as to whether a stop instruction is received (step 656). If a stop instruction is received, the process stops the audio and video and returns to the beginning of the speech sample (step 658). Next, the process ends.

If a stop instruction is not received in step 656, a determination is made as to whether a play instruction is received (step 660). If a play instruction is received, the process plays the audio and video from the current point in the speech sample (step 662) and ends. If a play instruction is not received, a determination is made as to whether a pause instruction is received (step 664). The play instruction and the pause instruction may be issued by selection of the same button in play control buttons 536 in FIG. 5A or by merely tapping a spacebar or the like. If a pause instruction is received, the process stops the audio and video at the current point in the speech sample (step 666) and ends.

If a pause instruction is not received in step 664, a determination is made as to whether a forward instruction is received (step 668). If a forward instruction is received, the process stops audio and video and advances to the end of the speech sample (step 670). Thereafter, the process ends. If a forward instruction is not received in step 668, the process ends.

The advantage of the present invention is the integration of video, audio, and waveforms and their derivatives of pitch and loudness that represent a speech model or speech attempt. A speech professional or language teacher may play a model speech production and a subject speech attempt simultaneously to compare articulation, audio analysis, and appearance of articulators. A subject may play a model speech production and record a speech attempt simultaneously to attempt to mimic the appearance of articulators. The synchronized use of audio, video, and audio analysis allows for controlled use of short audio and video clips. For example, a speech pathologist may place the cursor at a position in an acoustic display to attempt to identify the reason the subject cannot obtain a particular pitch or loudness. Once the cursor is placed in the appropriate position, the corresponding video is advanced to the same point in the speech sample and the speech pathologist may compare the facial information to find a solution. Thus, the user may move the cursor so to a point in the video, such as for example when the subject's lips touch, and examine the corresponding point in the derived pitch or loudness contours.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, the speech tool software may provide separate play control for each speech sample, or clicking on the portion of the screen where a visual model is displayed may initiate play. The speech tool software may also be modified to display two derivative acoustic displays, such as pitch and loudness, associated with each video window. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for providing feedback of speech production, comprising:

presenting audio data and video data of a first speech sample, wherein a first portion of the video data of the first speech sample is of a subject producing the audio data, and wherein a second portion of the video data represents the audio data produced by the subject producing the first speech sample;

displaying a first acoustic display representing the audio of the first speech sample; and indicating a current point in the first speech sample in association with the first acoustic display.

2. The method of claim 1, wherein the first acoustic display is a pitch pattern.

3. The method of claim 1, wherein the first acoustic display is a loudness pattern.

4. The method of claim 1, wherein the first speech sample is a model speech sample retrieved from a storage device.

5. The method of claim 4, further comprising:

presenting audio data and video data of a second speech sample, wherein a first portion of the video data of the second speech sample is of a subject producing the audio data, and wherein a second portion of the video data represents the audio data produced by the subject producing the second speech sample;

displaying a second acoustic display representing the audio of the second speech sample; and indicating a current point in the second speech sample in association with the second acoustic display.

6. The method of claim 5, wherein the second speech sample is a second model speech sample retrieved from a storage device.

7. The method of claim 1, further comprising:

collecting the audio data and the video data of the first speech sample; and storing the collected audio and video data in a storage device.

8. A method in a data processing system for providing feedback of speech production, comprising:

presenting audio data and video data of a first speech sample, wherein horizontally inverting the video data of the first speech sample to present a mirror image;

displaying a first acoustic display representing the audio of the first speech sample; and indicating a current point in the first speech sample in association with the first acoustic display.

9. A method in a data processing system for providing feedback of speech production, comprising:

presenting video data and audio data of a first speech sample, wherein a first portion of the video data is of a subject producing the audio data wherein a second portion of the video data represents the audio data produced by the subject producing the first speech sample;

displaying a first acoustic display representing the audio data of the first speech sample; and indicating a point on the first acoustic display corresponding to presentation of the audio data.

10. The method of claim 9, wherein the first speech sample is a model speech sample retrieved from a storage device.

11. The method of claim 10, further comprising:

presenting video data and audio data of a second speech sample, wherein the video data of the second speech sample is of a subject producing the audio data of the second speech sample;

displaying a second acoustic display representing the audio of the second speech sample; and synchronizing the first speech sample and the second speech sample.

12. The method of claim 11, wherein second speech sample is a second model speech sample retrieved from a storage device.

13. The method of claim 9, further comprising:

horizontally inverting the video data of the first speech sample to present a mirror image.

14. An apparatus for providing feedback of speech production, comprising:

presentation means for presenting audio data and video data of a first speech sample, wherein a first portion of the video data of the first speech sample is of a subject producing the audio data, and wherein a second portion of the video data represents the audio data produced by the subject producing the first speech sample;

display means for displaying a first acoustic display representing the audio of the first speech sample; and indication means for indicating a current point in the first speech sample in association with the first acoustic display.

15. The apparatus of claim 14, wherein the fire acoustic display is a pitch pattern.

16. The apparatus of claim 14, wherein the first acoustic display is a loudness pattern.

17. The apparatus of claim 14, wherein the first speech sample is a model speech sample retrieved from a storage device.

18. The apparatus of claim 17, further comprising:

means for presenting audio data and video data of a second speech sample, wherein a first portion of the video data of the second speech sample is of a subject producing the audio data, and wherein a second portion of the video data represents the audio data produced by the subject producing the second speech sample;

means for displaying a second acoustic display representing the audio of the second speech sample; and means for indicating a current point in the second speech sample in association with the second acoustic display.

19. The apparatus of claim 18, wherein second speech sample is a second model speech sample retrieved from a storage device.

20. The apparatus of claim 14, further comprising:

means for collecting the audio data and the video data of the first speech sample; and means for storing the collected audio and video data in a storage device.

21. An apparatus for providing feedback of speech production, comprising:

presentation means for presenting audio data and video data of a first speech sample, wherein horizontally inverting the video data of the first speech sample to present a mirror image;

display means for displaying a first acoustic display representing the audio of the first speech sample; and indication means for indicating a current point in the first speech sample in association with the first acoustic display.

22. A apparatus for providing feedback of speech production, comprising:

presentation means for presenting video data and audio data of a first speech sample, wherein a first portion of the video data is of a subject producing the audio data, wherein a second portion of the video data represents the audio data produced by the subject producing the first speech sample;

display means for displaying a first acoustic display representing the audio data of the first speech sample; and indication means for indicating a point on the first acoustic display corresponding to presentation of the audio data.

23. The apparatus of claim 22, wherein the first speech sample is a model speech sample retrieved from a storage device.

24. The apparatus of claim 23, further comprising:

means for presenting video data and audio data of a second speech sample, wherein the video data of the second speech sample is of a subject producing the audio data of the second speech sample;

means for displaying a second acoustic display representing the audio of the second speech sample; and means for synchronizing the first speech sample and the second speech sample.

25. The apparatus of claim 24, wherein second speech sample is a second model speech sample retrieved from a storage device.

26. The apparatus of claim 22, further comprising:

means for horizontally inverting the video data of the first speech sample to present a mirror image.

27. A computer program product, in a computer readable medium, for providing feedback of speech production, comprising:

instructions for presenting audio data and video data of a first speech sample, wherein a first portion of the video data of the first speech sample is of a subject producing the audio data and wherein a second portion of the video data represents the audio data produced by the subject producing the first speech sample;

instructions for displaying a first acoustic display representing the audio of the first speech sample; and instructions for indicating a current point in the first speech sample in association with the first acoustic display.

28. A computer program products in a computer readable medium, for providing feedback of speech production, comprising:

instructions for presenting video data and audio data of a first speech sample, wherein a first portion of the video data is of a subject producing the audio data, wherein a second portion of the video data represents the audio data produced by the subject producing the first speech sample;

instructions for displaying a first acoustic display representing the audio data of the first speech sample; and instructions for indicating a point on the first acoustic display corresponding to presentation of the audio data.

* * * * *

UNITED STATES PATENT AND TRADEMARK OFFICE

CERTIFICATE OF CORRECTION

PATENT NO. : 6,728,680 B1
APPLICATION NO. : 09/714762
DATED : April 27, 2004
INVENTOR(S) : Aaron et al.

It is certified that error appears in the above-identified patent and that said Letters Patent is hereby corrected as shown below:

(54) Title, line 2: after “FEEDBACK OF” delete “SPEED” and insert --SPEECH--.

Col. 1, line 2: after “FEEDBACK OF” delete “SPEED” and insert --SPEECH--.

Col. 11, line 26: after “wherein the” delete “fire” and insert --first--.

Col. 12, line 47: after “program” delete “products” and insert --product,--.

Signed and Sealed this

Fifth Day of December, 2006

JON W. DUDAS
*Director of the United States Patent and Trademark Office*